United States Patent [19]

Passmore et al.

[11] 4,309,763

[45] Jan. 5, 1982

[54] DIGITAL SONOBUOY

[75] Inventors: Paul R. Passmore, Dallas, Tex.; Elio Poggiagliomi, London, England

[73] Assignees: Refraction Technology, Inc., Dallas; Geoquest International Ltd., Houston, both of Tex.

[21] Appl. No.: 903,876

[22] Filed: May 8, 1978

Related U.S. Application Data

[63] Continuation-in-part of Ser. No. 773,528, Mar. 2, 1977, abandoned.

[51] Int. Cl.³ .......................... G01V 1/22; G01V 1/38
[52] U.S. Cl. .......................................... 367/3; 367/15; 367/77; 367/79; 328/162; 370/113
[58] Field of Search .................... 340/15.5 TS, 7 R, 2; 178/69.1; 328/31, 32, 34, 115, 135, 162; 179/15 BL; 367/3, 15; 370/113; 367/77, 79

[56] References Cited

U.S. PATENT DOCUMENTS

| | | | |
|---|---|---|---|
| 3,325,778 | 6/1967 | Ballard | 340/2 |
| 3,721,835 | 3/1973 | Hess | 328/31 |
| 3,764,922 | 10/1973 | Gilbert | 328/162 |
| 3,819,864 | 6/1974 | Carroll et al. | 179/15 BL |
| 3,873,961 | 3/1975 | Lee et al. | 340/15.5 TS |
| 3,886,494 | 5/1975 | Kostelnicek et al. | 340/15.5 TS |
| 3,938,073 | 2/1976 | Fort et al. | 340/15.5 TS |
| 3,990,036 | 11/1976 | Savit | 340/15.5 TS |
| 4,005,273 | 1/1977 | Siems | 179/15 BL |
| 4,023,140 | 5/1977 | Siems et al. | 340/15.5 TS |
| 4,042,906 | 8/1977 | Ezell | 340/15.5 TS |

Primary Examiner—Howard A. Birmiel
Attorney, Agent, or Firm—Kenneth R. Glaser

[57] ABSTRACT

Disclosed is an underwater seismic exploration system utilizing a sonobuoy for the radio telemetry of seismic data signals to a remotely located receiver, the sonobuoy including circuitry for digitizing the analog signals generated by hydrophones suspended from the sonobuoy prior to the application of these signals to an RF antenna. The remotely located receiver includes an antenna for receiving the transmitted modulated digital signal information, and means for demodulating, demultiplexing, and appropriately converting the signals for either analog or digital recording of the received data.

5 Claims, 13 Drawing Figures

DIGITAL SONOBUOY

This application is a continuation-in-part of pending application, Ser. No. 773,528, filed Mar. 2, 1977 now abandoned.

This invention generally pertains to marine seismic exploration, more particularly to the digital telemetering of seismic data collected by hydrophones, and even more particularly to a digital type sonobuoy.

The depletion of land oil reserves has even further emphasized the importance of marine seismic exploration and the consequent need for improved techniques and equipment for carrying out this type of exploration. Among the methods presently employed for the exploration and mapping of underwater geological formations is the use of sonobuoys having hydrophones associated therewith for detecting and monitoring the particular seismic disturbances, the signal data then being either recorded at the sonobuoy or radio transmitted to a remote receiving station where it is collected and recorded. Due to the inconvenience and expense of collecting the data from the sonobuoys themselves, it is far preferable to utilize radio transmitting sonobuoys with the receiver located on the shooting boat.

A significant barrier to the use of radio transmission of the seismic data from the sonobuoy is that present designs of sonobuoys typically employ analog circuitry for the processing of the signals, which therefore inhibits the effective and accurate transmission of the collected data. Among the disadvantages of these "analog" sonobuoys is the "noise" which would be introduced during both the collection and transmission of the data, thus confusing and diminishing the reliability of the information that would be received at the receiver.

It is therefore a principal object of the present invention to provide new and improved methods and equipment for marine seismic exploration.

It is another object of the invention to provide a new and improved telemetry system utilizing sonobuoys for the collection and transmission of seismic data.

It is a still further object of the present invention to provide sonobuoys of new and improved digital design for the radio transmission of digitally encoded signals for receipt and decoding by a receiver located on the shooting boat.

In accordance with these and other objects, the present invention is directed to an underwater seismic exploration system comprising one or more sonobuoys of digital design effective to detect, encode, and radio transmit seismic data to a receiver preferably located on the shooting boat, the remotely located receiver having circuitry effective to receive, decode, and record the transmitted data. Each sonobuoy includes circuitry for amplifying and filtering the electrical analog signals generated by a plurality of hydrophone transducers, multiplexer circuitry for inputting the data from each hydrophone channel to an analog-to-digital converter which generates digital pulses representative of the incoming analog signals, and circuitry for modulating and transmitting the digital signals by way of an RF antenna. The system receiver includes an antenna for receiving the transmitted modulated digital signal information, and means for demodulating, demultiplexing, and appropriately converting the signals for either analog or digital recording of the received data.

Specific features of the present invention, as well as additional objects and advantages thereof, will become more readily apparent by reference to the following detailed description, taken in conjunction with the accompanying drawings, wherein:

Figure 1:
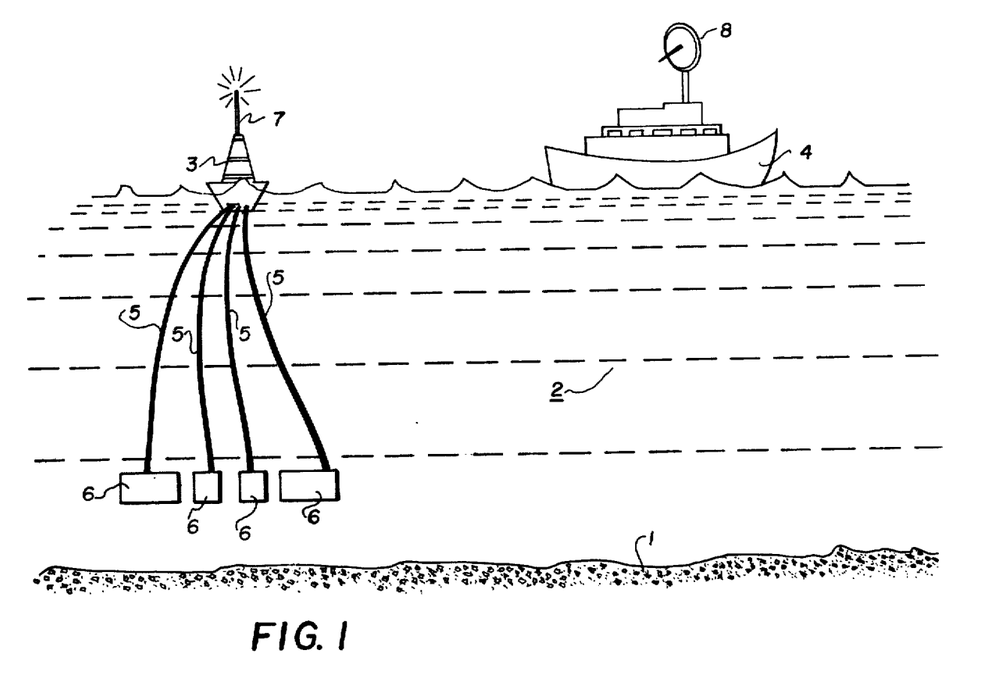
FIG. 1 is a diagrammatic illustration of a method of marine seismic exploration, utilizing the digital telemetry system of the present invention.

Referring initially to FIG. 1, the seismic exploration of the geological or earth formation 1 beneath the body of water 2 is carried out, in accordance with the method of the present invention, with one or more sonobuoys 3 positioned to float at the surface of the body of water at predetermined spaced locations from the boat or vessel 4.

Suspended from each sonobuoy by way of cables 5 are a plurality of hydrophones 6. As is conventionally known, the hydrophones are transducer devices for detecting, and converting to electrical analog signals representative thereof, pressure waves traveling through the water. Depending upon the particular application, any number of such hydrophones (four of which are shown in FIG. 1) may be associated with each sonobuoy and disposed in the desired pattern or array.

In accordance with a unique feature of the present invention, a signal processing network (designated by the reference numeral 10 in FIG. 2) is disposed within each sonobuoy and is electrically coupled at its input (by way of the cables 5) to the outputs from hydrophones 6. The network 10 is effective to convert the analog signals from the hydrophones into modulated digital signals representative thereof, the information in this digital format then being transmitted by way of an RF antenna 7 to a receiving antenna 8 located on the boat 4. The output from the antenna 8 is coupled to a receiver network on the boat (depicted in FIG. 3 by the reference numeral 11) which is effective to demodulate and convert the transmitted signals for suitable recording of the information in either a digital or analog format.

The vessel 4 would also be equipped with suitable instrumentalities of energy sources, such as explosives, for generating seismic disturbances within the body of water 2, which disturbances (or their refracted or reflected components) being detected by the hydrophone array, all as conventionally known.

Figure 2:
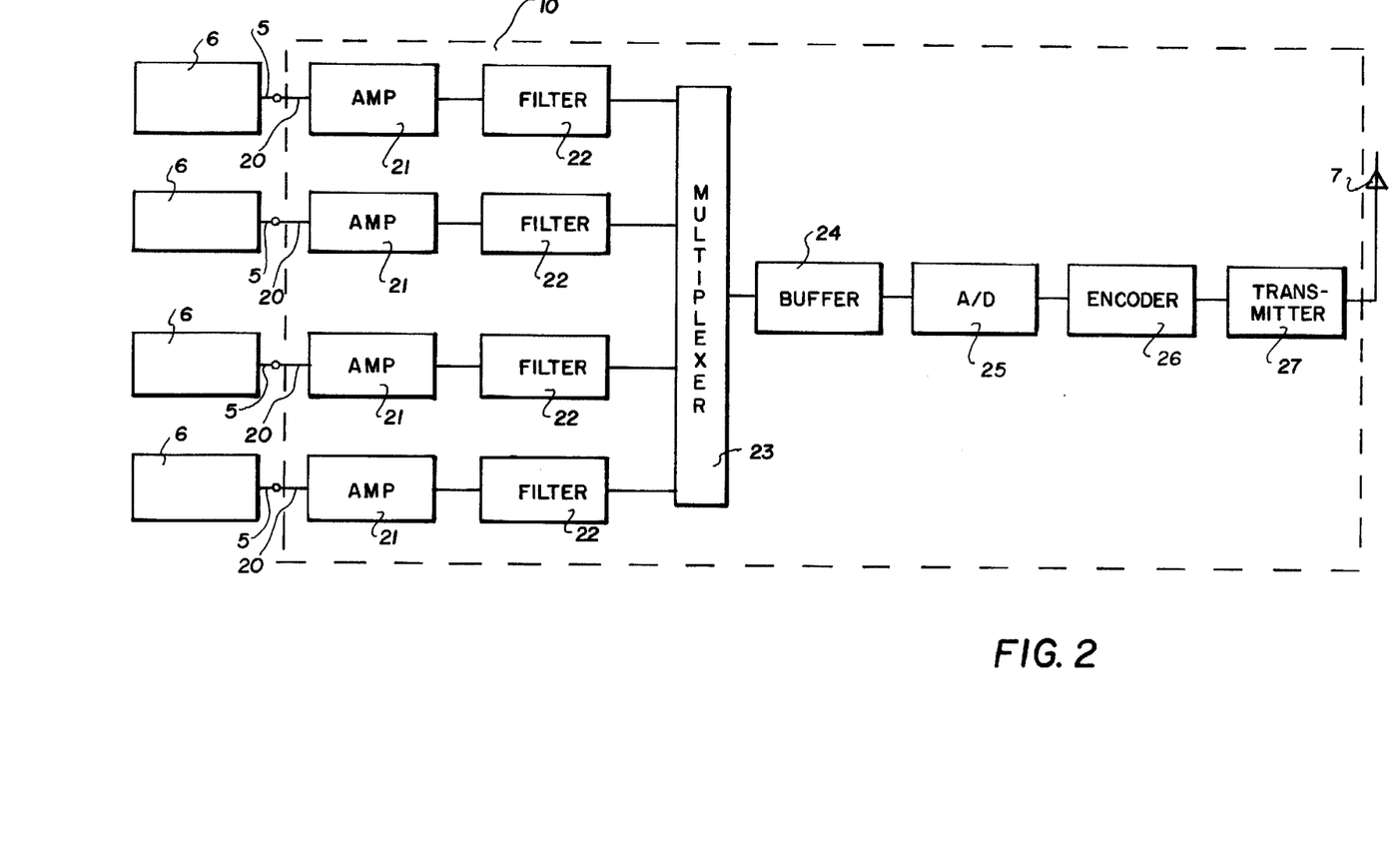
FIG. 2 is a block diagram of a preferred embodiment of the digital sonobuoy of the present invention.

Referring now to FIG. 2, the output from each of the hydrophones 6 are coupled by way of cables 5 to the input signal channels 20 of the sonobuoy signal processing network 10, the number of such channels corresponding to the number of hydrophones 6.

Disposed within each signal channel 20 is a preamplifier 21 and an active seismic filter network 22, the latter network comprising conventional low-cut, and aliasing filters. The amplifier stage 21 is effective to sufficiently amplify the incoming analog signals to overcome any undesired noise associated with the subsequent filter stage. Additionally, and if desired, an automatic gain amplifier (not shown) may be provided at the output of the filter stage 22 for providing additional precision gain of the signals processed within each signal channel 20.

Each of the channels 21 is coupled to the input of a conventional multiplexer 23 which is effective to multiplex the analog signal information in each of the channels 20, on a time sharing basis, and serially input the composite information (representing the signal data from each hydrophone 6) to an analog-to-digital converter 25 (by way of an intermediate or buffer stage 24). The buffer stage 24 would include a wide band amplifier network, referred to in the art as a floating point amplifier, appropriately interconnected with a sample and hold network. As known, the floating point amplifier network suitably prepares the signals for processing by the A to D converter to "floating point form", while the sample and hold network serves to assure sampling of the incoming signals to the converter 25 for the desired time period to effect the requisite A to D conversion.

The A to D converter 25 is effective to digitize the incoming analog signals to a pulse code representative of the information content of these signals and apply the resulting parallel digital data to an encoder 26. The parallel digital data, the automatic gain code, the channel code, and a parity signal are serialized and encoded by the coder 26 and applied to a frequency modulated VHF transmitter 27 which then feeds the RF antenna 7 for transmitting the modulated digital signal information to the antenna 8 at the boat. Power for the network 10 can be supplied by a battery within the sonobuoy 3.

Figure 3:
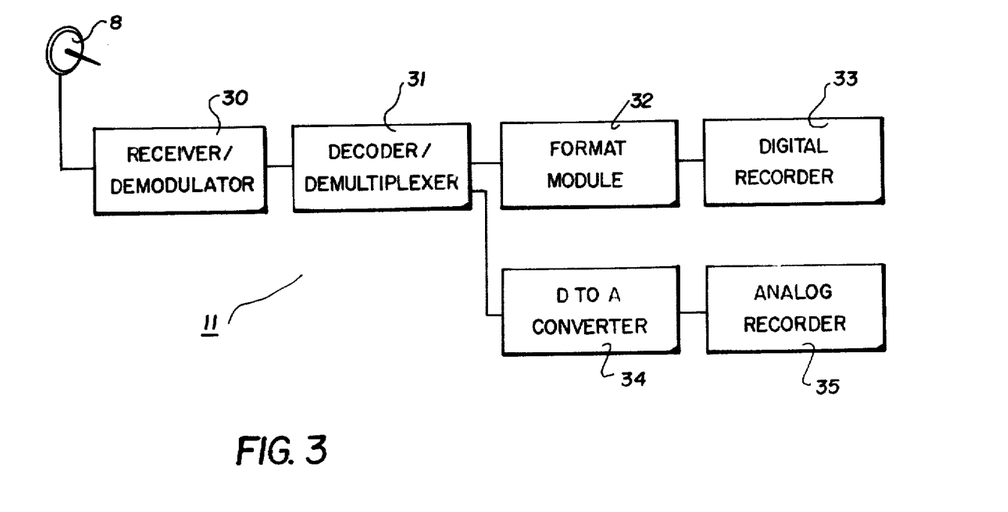
FIG. 3 is a block diagram of a preferred embodiment of the receiver network for receiving and decoding signals transmitted by the digital sonobuoy depicted in FIG. 2.

Referring now to FIG. 3, the transmitted data received at the antenna 8 is then fed to the initial receiver/demodulator stage 30 of the receiver network 11 where it is thereafter decoded and demultiplexed in the stage 31. The decoded data can then be coupled by way of format module 32 to one or more conventional recorders 33 for the digital presentation or display of the data; or alternatively can be coupled through a conventional D to A converter 34 to an analog recorder 35 to representation of the seismic data in analog form.

The digital telemetry system, and particularly the digital sonobuoy, of the present invention, is uniquely suited to be employed in a number of applications employed in marine seismic exploration. For example, the system can function as a seismic source calibrator for accurately calibrating, and defining the real signature of the energy source; or alternatively, the system and set of digital sonobuoys can be employed in methods generally referred to as either reflection, refraction, or "3-D" prospecting. In any application, the use of such a digital telemetry system as hereindescribed would operate over a greater dynamic range, and with considerably less distortion, than that associated with conventional analog sonobuoys.

The digital sonobuoy of the invention must function under rather demanding conditions, and, of course, it is more useful, the greater the extent that it can successfully operate within these conditions. A number of factors contribute to such successful operation, including several novel subsystems which form parts of the overall digital sonobuoy system. These subsystems are important for their individual contributions to successful operation of the overall system. In addition, they have been conceived with a view toward the operation of the overall system in such a way that the subsystems cooperate to successfully meet the many constraints on the digital sonobuoy.

Since the digital sonobuoy is floating in the ocean, it is subject to temperature variations and mechanical shock which strain the operational stability of its circuitry. The device is battery-operated, so it is quite important that power consumption be kept low. The sonobuoy may not be made indefinitely large, because a number of them must be frequently moved back and forth between the ocean and a ship, and they must be stored on the ship. At the same time, it is important that the device operate with high accuracy. The radio must have power and accuracy capable of transmitting over relatively long distances, such as 100,000 feet. Moreover, the data rates to be transmitted are quite high. Finally, it is highly desirable if the radio transmission can be accomplished within the constraints of the Federal Communications Commission.

Digital transmission is conventionally accomplished by transmitting different tones for ones and for zeroes. In the preferred embodiment of the present invention, a form of frequency-shift keying (FSK) is used. That is, an FM carrier is modulated not by tones, but by the digital data wave form. This results in lower band width and a commensurate savings in power required to achieve a selected range and accuracy. The sonobuoy of the present invention has excellent power consumption characteristics permitting it to transmit continuously as opposed, for example, to transmitting only at selected intervals.

Figure 4:
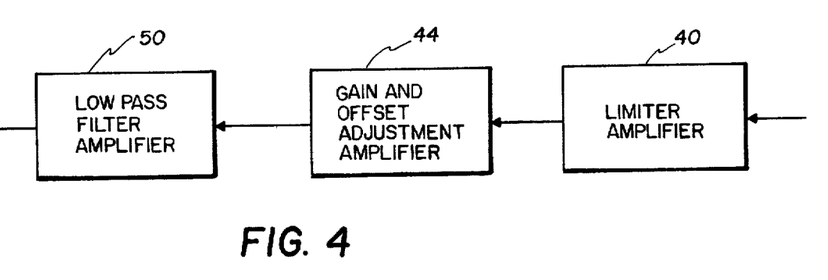
FIG. 4 is a block diagram of a portion of an encoder in the digital sonobuoy of the present invention.
Figure 5:
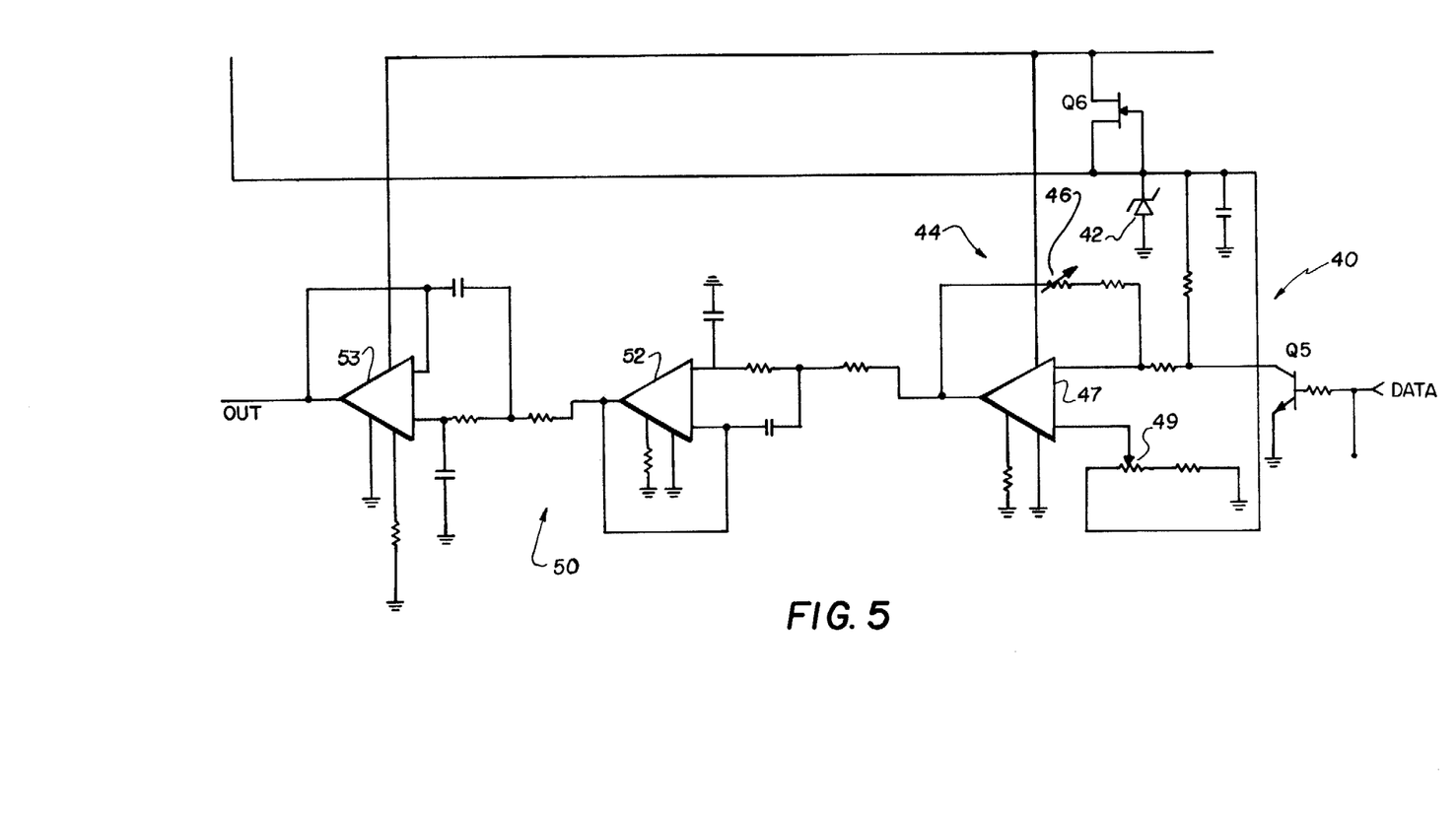
FIG. 5 is a schematic diagram of the encoder portion of FIG. 4.

FIG. 4 is a block diagram showing the major functions of final stages of encoder 26, in a preferred embodiment. A schematic diagram of this encoder subsystem is seen in FIG. 5. The input to the subsystem FIGS. 4 and 5 is a serial digital data stream. The overall function of this subsystem is to condition the digital data waveform so as to improve certain aspects of its transmission when it is applied to transmitter 27.

Limiter amplifier 40 performs a wave-shaping function on its input. As seen in FIG. 5, amplifier 40 includes a transistor Q5 supplied by a regulated voltage, provided by field effect transistor Q6 and zener diode 42. Amplifier 40 is designed so that it is driven into saturation by a wide range of inputs. As a result, the stages of the encoder following amplifier 40 are provided with digital data containing clean, well-defined square waves.

Amplifier 44 provides a gain adjustment by means of variable resistor 46 in a feedback loop of operational amplifier 47. The offset of the digital signal may be adjusted by varying resistor 49 which is connected in a biasing relationship to an input of operational amplifier 47.

The gain of amplifier 44 controls the frequency deviation of the signal which will be transmitted by transmitter 27 of the digital sonobuoy system. The offset adjustment controls the frequencies which will be transmitted for a one and for a zero. Thus, amplifier 44 provides adjustment of the transmitted frequencies and frequency deviation by adjustment of the modulating signal itself. These adjustments could be made in the transmitter 27. However, the design of FIGS. 4 and 5 permits the radio frequency circuitry of transmitter 27 to be designed and adjusted with respect to optimal transmission, including stability characteristics. Then the particular frequency and deviation transmitted can be adjusted separately through amplifier 44.

Amplifier 50 is a four-pole, low-pass, filter amplifier. Each of operational amplifiers 52 and 53, along with their associated resistance capacitance networks, provides two-poles of filtering. Because of the limiter amplifier 40, low-pass filter amplifier 50 is provided with a well-defined, square wave input. The object of filter amplifier 50 is to filter out those high-frequency components of the square wave which contribute little to information transmission. As a result, there is reduction in the bandwidth of the signal transmitted by the digibuoy system. In a preferred embodiment, filter amplifier 50 filters a single square wave bit to provide an output which closely approximates the function sin X/X.

Figure 6:
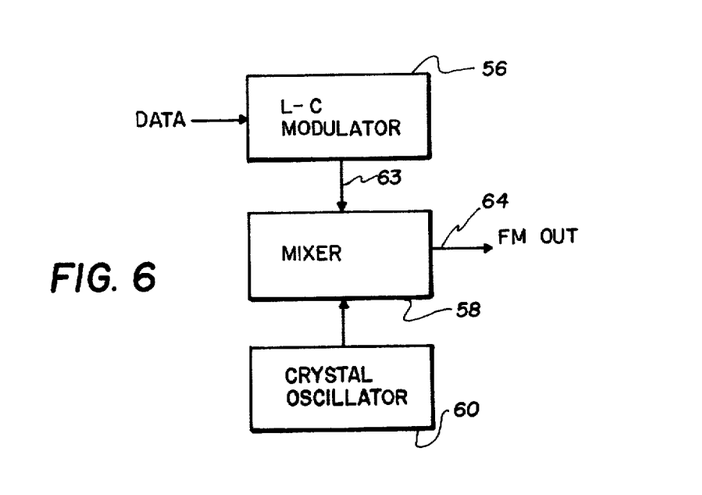
FIG. 6 is a block diagram of a modulation subsystem for the digital sonobuoy of the invention.
Figures 7, 8:
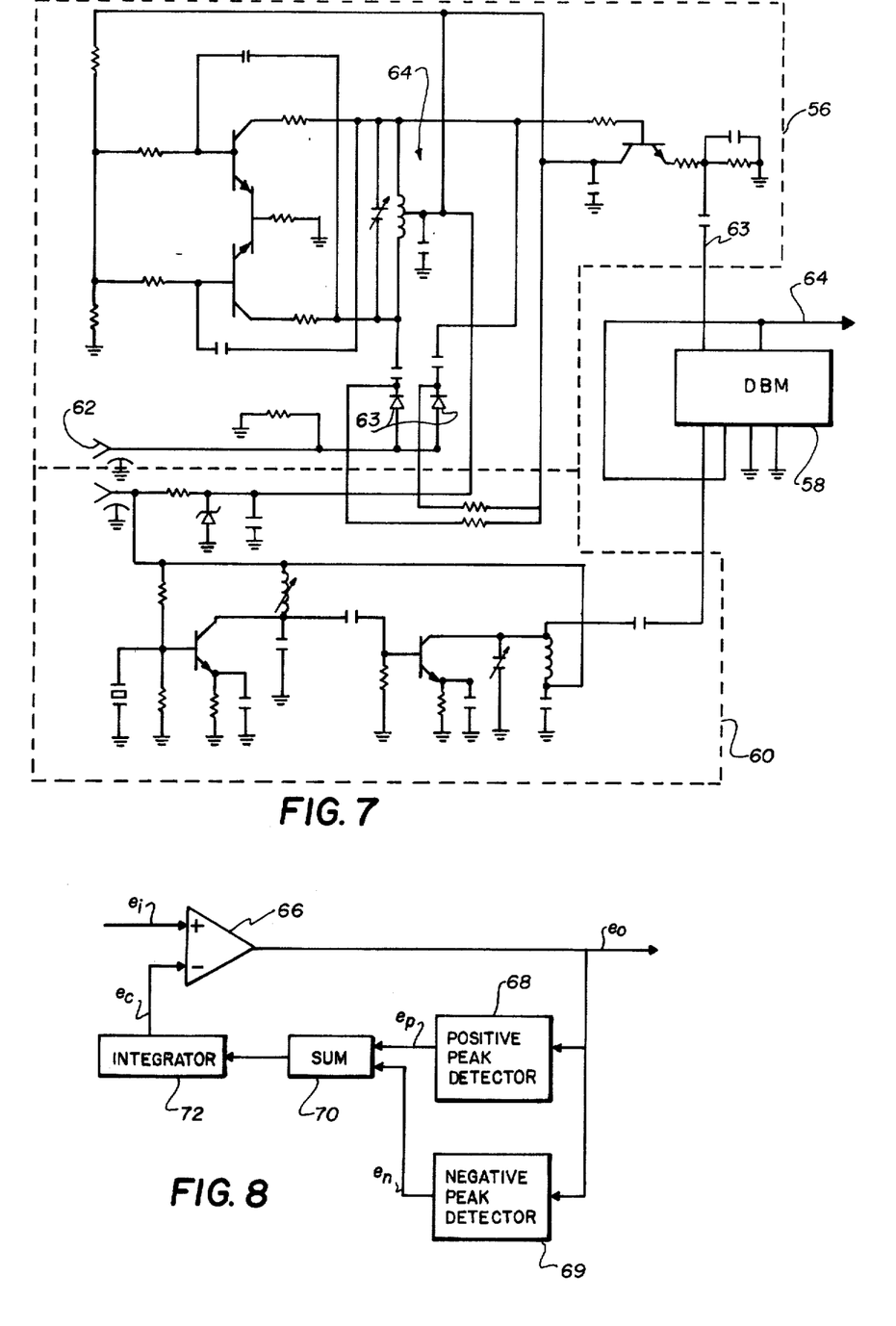
FIG. 7 is a schematic diagram of the subsystem of FIG. 6.
FIG. 8 is a block diagram of the operation of an automatic symmetry corrector for the digital sonobuoy of the invention.

FIGS. 6 and 7 illustrate portions of transmitter 27 which allow it to combine a relatively high frequency deviation with excellent stability. Conventionally, a crystal controlled modulator exhibits very high stability, but it is a high Q circuit with an impedance discontinuity near the carrier frequency. If an attempt is made to transmit a frequency deviation outside certain limits with such a modulator, the impedance discontinuity is encountered introducing spurious modulation products. These frequency deviation limits can be encountered for example when the digital sonobuoy system of the invention is used to transmit high data rates. The subsystem of FIGS. 6 and 7 was conceived to avoid these limitations.

Circuit 56 is a low-frequency FM modulator using an L-C Circuit oscillator. The output of modulator 56 is applied to a mixer 58, along with output of a crystal oscillator 60 operating at a VHF frequency. In modulator 56, the baseband signal from encoder 26, applied at input 62, varies the capacitance of diodes 63 to vary the frequency output of a tuned L-C circuit indicated generally by the reference numeral 64. The mixer 58 can be of conventional design, including a double balanced mixer. The input to the mixer, that is, the output 63 of modulator 56, is a frequency modulated waveform. The carrier frequency of output 63 is that of the L-C oscillator in modulator 56, while the modulating signal is the baseband signal 62. The output of mixer 58 includes two signals, each frequency modulated by the base band signal. One has a carrier frequency which is the sum of the modulator 56 carrier frequency and the frequency of the crystal oscillator 60. The other modulated signal at the output of mixer 58 has a carrier frequency which is the difference of the L-C and crystal oscillator frequencies. With filtering, one of these modulated signals, for example the higher one, can be isolated as the signal to be transmitted by transmitter 27.

In the modulated output 64 of the subsystem of FIGS. 6 and 7, the carrier frequency is in largest part established by the frequency of the crystal controlled oscillator 60. To the extent that it is thus established, the transmitted carrier frequency has the stability of the crystal oscillator 60. But the modulation is not carried out in the crystal oscillator, so the self-resonances of the crystal oscillator do not limit the frequency deviation of the possible modulation. Accordingly, the sonobuoy system of the present invention is capable of transmitting high data rates with a level of transmitter stability which would not otherwise be possible.

Several novel aspects of the decoder/demultiplexer 31 of FIG. 3 contribute to the successful operation of the sonobuoy system of the invention. One of the problems to be dealt with in the decoder is error introduced by frequency drift. Despite measures taken to insure stability of the transmitting and receiving process, there is the possibility of drift which results in long-term variations in voltage level which are input to decoder/demultiplexer 31. If this input is decoded simply by comparing it to fixed voltage levels, decoding errors could result. Such problems do not occur in FM receivers where AC coupling is suitable. The problem is that in many applications of the digital sonobuoy, AC coupling may not be used. In these applications, it is possible to experience a large number of ones or a large number of zeroes consecutively. In an AC coupled system, both such conditions could result in the same output; accordingly, DC coupling must be used.

Figure 9:
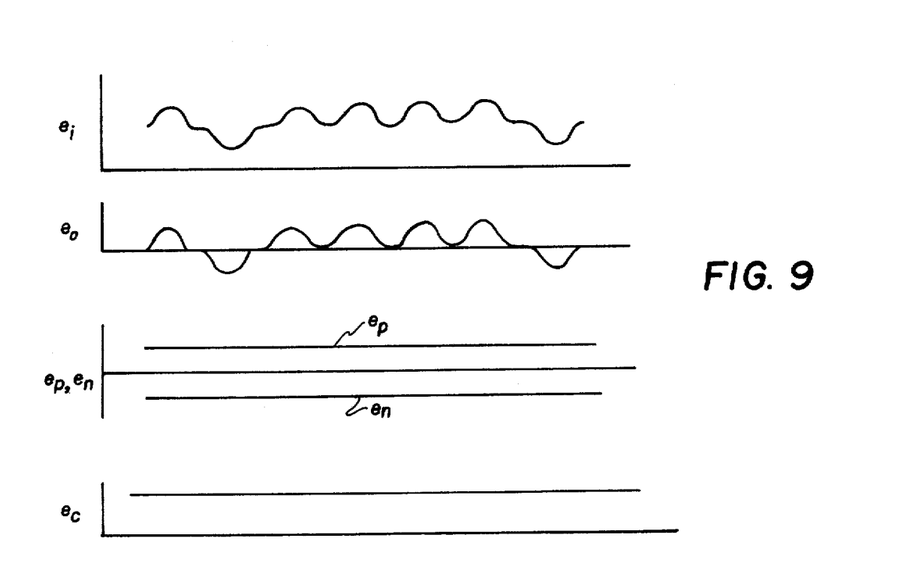
FIG. 9 is an illustration of voltage waveforms showing the operation of automatic symmetry correction of FIG. 8.

FIG. 8 illustrates an automatic symmetry corrector (ASC) which is in the initial stages of decoder 31. As illustrated in FIG. 9, the ASC circuit receives an input waveform $e_i$ from the receiver/demodulator 30 which has a DC component. It is this DC component which is subject to drift and must be compensated for. The waveform shown in FIG. 9 is a return-to-zero code, wherein the signal returns to a baseline after the occurrence of either a one or a zero. In a practical circuit, there can be a sign inversion between input and output; for clarity, this will not be shown with reference to FIGS. 8 and 9. Decoder circuits can then operate on $e_o$ to detect ones and zeroes by comparison with absolute voltage levels.

The ASC circuit is a feedback system built around baseband amplifier 66. The feedback loop includes a positive peak detector 68, negative peak detector 69, a summing function 70, and an integrator 72. The loop output, voltage $e_c$ of integrator 72 is subtracted from input $e_i$ of the ASC at the input to amplifier 66. As is well-known with respect to closed loop systems, the voltage $e_c$ will tend to approach the voltage $e_i$. As will become apparent, voltage $e_c$ is approximately a DC level, in the steady state. As a result, it does not actually equal the voltage $e_i$, but the DC component thereof. Because of the subtraction of $e_c$ from $e_i$, the output voltage $e_o$ varies about zero. The positive peak detector 68 provides an output voltage which is equal to the maximum positive voltage occurring at its input over a long period in the past. Thus, in FIG. 9, $e_p$ has the peak value of the waveform $e_o$. The output $e_n$ of negative peak detector 69 has the value of the negative peaks of $e_o$. The voltages $e_p$ and $e_n$ are summed, and applied to integrator 72. When the system is balanced, $e_p$ and $e_n$ are almost equal and the output of integrator 72 changes very little, holding its output, $e_c$ the correcting voltage, steady.

Figure 10:
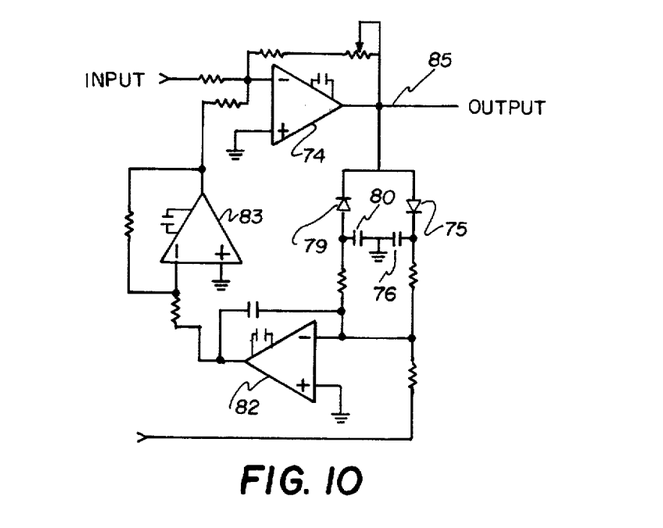
FIG. 10 is a schematic diagram of circuit performing automatic symmetry correction in accordance with FIG. 8.

FIG. 10 shows more detailed circuitry capable of performing the automatic symmetry correction functions illustrated in FIG. 8. As indicated above, there are sign inversions in the circuit of FIG. 10 which do not correspond to the illustrative waveforms of FIG. 9. The circuit formed by operational amplifier 74 corresponds to baseband amplifier 66. One of the peak detector functions is performed by diode 75 and capacitor 76, while the other is performed by diode 79 and capacitor 80. The detected peaks are summed and input to an integrator circuit which includes operational amplifier 82. Amplifier 83 applies the output of the integrator to the baseband amplifier. The output 85 of the baseband amplifier varies about zero and is in a condition for decoding.

Figure 11:
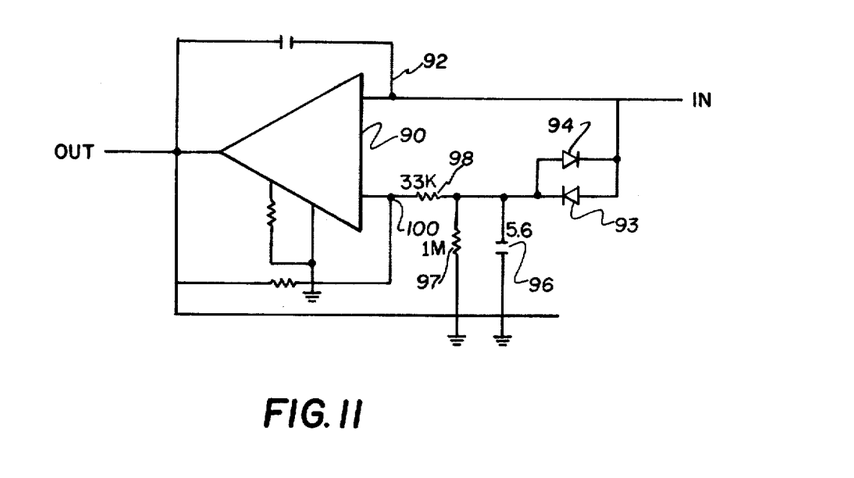
FIG. 11 is a digital decoder for a digital sonobuoy of the invention, employing automatic symmetry correction different from that illustrated in FIG. 8.

FIG. 11 shows a decoder system which deals differently with automatic symmetry correction. It is a circuit for decoding non-return-to-zero digital data, which varies between only two voltage levels. In this case, an operational amplifier 90 is connected as a comparator. The input signal, from the receiver/demodulator is applied directly to one input 92 of amplifier 90. In addition, the input signal is connected to the anode of a diode 93 and the cathode of a diode 94. The opposite ends of these diodes are connected together and to a parallel combination of a capacitor 96 and high impedence resistor 97. The voltage to ground across capacitor 96 is applied through a resistor 98 to the other input 100 of amplifier 90.

The circuit of FIG. 11 is effective in those data applications where there is roughly an equal probability that any bit will be a one or zero. In such a situation, capacitor 96 is charged through diode 93 toward the positive peak value of the input signal during, say, a one bit. Then, during a zero bit, it charged toward the negative peak value through diode 94. The time constant of resistor 97 and capacitor 96 is chosen relatively long, so that the voltage across capacitor 96 becomes a smooth voltage which tends toward the average of the positive and negative peaks of the input signal. The circuit amplifier 90 operates as a comparator to detect when the voltage 92 is below the average value, in which case the output of amplifier 90 goes to its most negative value. When the voltage at input 92 is above the average value, the output of the amplifier 90 goes to its positive limit.

As described above, the decoder FIG. 11 is useful when the data can be expected to be rather evenly interspersed ones and zeroes. It would not be suitable in the presence of long strings of ones or zeroes, which would cause the voltage stored on capacitor 96 to shift significantly.

Figure 12:
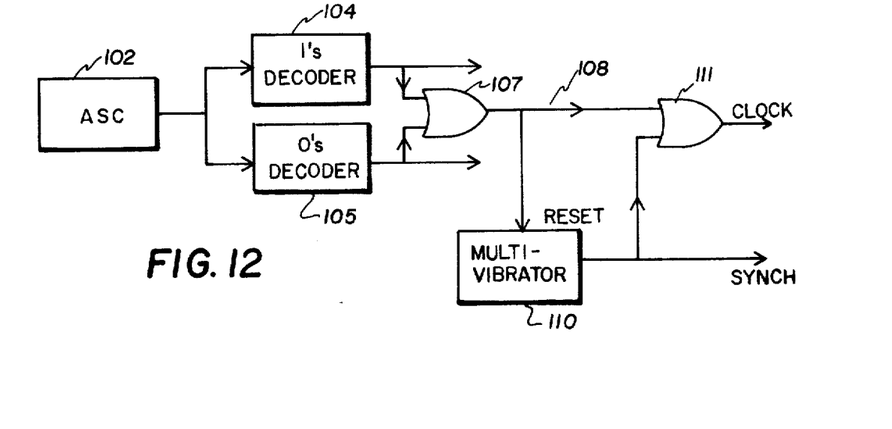
FIG. 12 is a block diagram of synchronization system for the digital sonobuoy of the invention, using return-to-zero digital code.

FIG. 12 is a block diagram of a part of decoder/demultiplexer 31 which derives a clock interval and word synchronization from received return-to-zero digital data. After the data has been processed by automatic symmetry corrector circuit 102, it is ready to be decoded by a ones decoder 104 and a zeroes decoder 105. Decoder 104 applies a one to OR gate 107 whenever a one occurs in the data stream. Decoder 105 applies a one to gate 107 upon the occurence of a zero. Thus the output 108 of OR gate 107 is one, whenever, a one or a zero occurs in the data.

When the digital data is encoded by encoder 26, a new word is defined by a bit space containing neither a one nor a zero. To achieve word synchronization in the decoder, it is important to detect this absence of a one or a zero. The output 108 of OR gate 107 is connected to a reset input of a multivibrator 110 which generates pulses at a period slightly greater than the bit period of the received digital data. So long as a one or a zero is detected by decoders 104 and 105, there is a pulse at OR gate output 108, resetting the multivibrator 110 to prevent it from producing an output. Upon the absence of a one or a zero, the multivibrator 110 does produce an output, which is the synchronization signal indicating a new word of data. The output for multivibrator 110 is also combined with output 108 by OR gate 111 to produce a signal with a pulse appearing at every data bit position. This becomes a clock pulse for the decoder.

Figure 13:
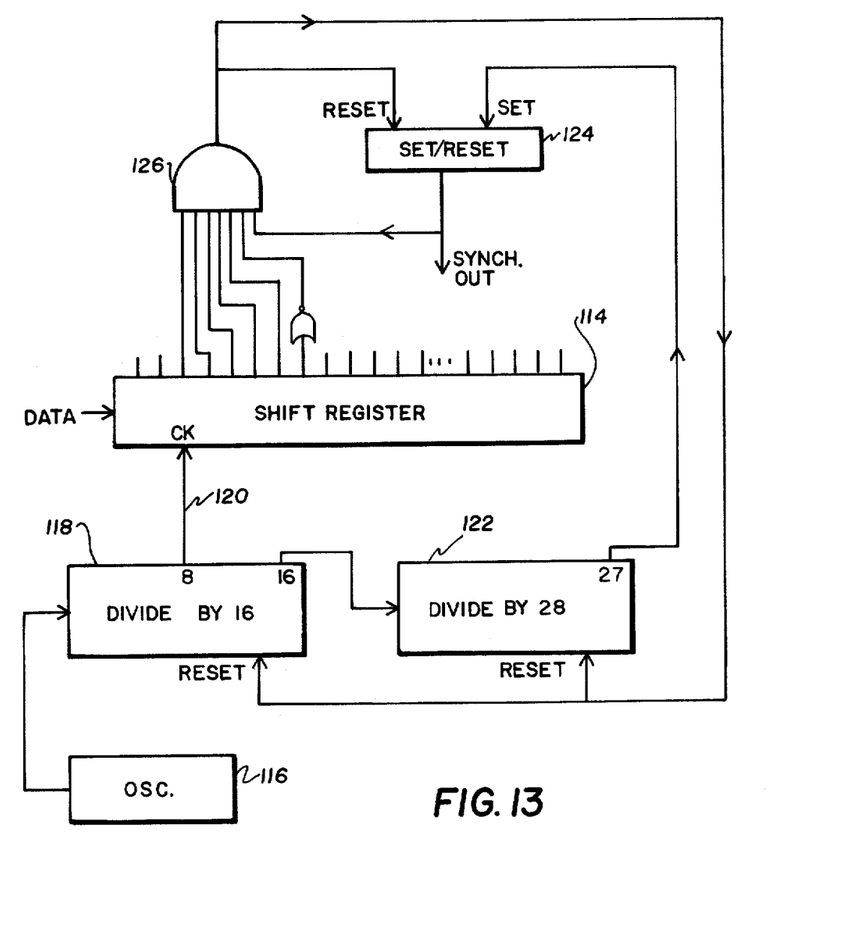
FIG. 13 is a block diagram of a synchronization system using non-return-to-zero digital code.

FIG. 13 illustrates a system deriving clock and synchronization information from received non-return-to-zero digital data. This function is carried out in connection with the conversion of the data from serial to parallel in a shift register 114. In a preferred embodiment of the digital sonobuoy system, the output of shift register 114 is a 28 bit word. Basic timing for the decoding process is provided by a crystal oscillator 116 which should be as close as possible to the clock frequency used in the encoding sections of the sonobuoy system. This frequency is divided by 16 in circuit 118. Circuit 118, upon reset, counts pulses from oscillator 116 until it counts sixteen; then it automatically resets. Upon the eighth counted pulse, circuit 118 provides an output 120 to the clock input of shift register 114. The output 120 is taken at the eighth pulse in order to clock the shift register 114 near the middle of each data bit. Upon the sixteenth counted pulse, circuit 118 provides an output to divide-by-28 circuit 122. Circuit 122, upon reset, counts 28 pulses before automatic reset. Upon the 27th pulse, it sends an output to the "set" input of set/reset circuit 124.

The data of the digital sonobuoy system is encoded with 5 ones at the end of each word and a zero at the beginning of each word. AND gate 126 detects this bit sequence, having five sequential bits from register 114 connected to the input thereof, along with a sixth bit connected through an inverter. However, there is another input to AND gate 126, namely the output of set/reset circuit 124. The output of AND gate 126 goes both to the reset input of circuit 124 and to the reset inputs of divide-by-16 circuit 118 and divide-by-28 circuit 122.

In the operation of the system of FIG. 13, set/reset circuit 124 is initially set, so that on the first occurrence of the 5 ones and 1 zero pattern, AND gate 126 produces an output, resetting set/reset circuit 124 and the divide-by-16 and divide-by-28 circuits. Then set/reset circuit 124 is not set again until the output from circuit 122 at the 27th pulse. This causes the output of set/reset circuit 124 to become a one, so that upon the next shift of register 114, if the particular bit pattern is again present, AND gate 126 can again produce a one. Thus, the system of FIG. 13 is checking for the occurrence of a particular bit signature occurring repetitively each 28 bits. This protects against false recognition of data as a synchronization code.

In the case that the synchronization bit pattern does not occur directly after the setting of set/reset circuit 124, then AND gate 126 does not send out a reset pulse to the system and waits to detect the next occurrence of the particular bit pattern. After a few data words have been received, the system of FIG. 13 locks onto the correct set of bits. The decoder clock provided by circuit 118 is reset upon the occurrence of every word, thus synchronizing it with the encoder clock. The output of set/reset circuit 124 becomes the word sync signal for the decoding system.

Various modifications to the disclosed embodiment, as well as alternate embodiments of the present invention may become apparent to one skilled in the art without departing from the spirit and scope of the invention as defined by the appended claims.

What is claimed is:

1. A marine seismic exploration system, comprising:
(1) a sonobuoy for receiving seismic information from a plurality of hydrophones comprising:
   (a) means for generating digital data representative of said seismic information, in a pulse waveform, said waveform including an indicator signifying the occurrence of a digital word;
   (b) means for radio transmitting said digital data by frequency-shift keying, including
      (i) means for processing the digital data to generate an amplitude limited waveform for the radio transmission, including,
         means for adjusting the peak to peak amplitude of said limited waveform,
         means for adjusting the offset of the waveform with respect to a base line, and
         means for low pass filtering the amplitude limited waveform,
      (ii) an inductance-capacitance oscillator for generating an output of a first frequency,
      (iii) means for modulating said first frequency output with the output of the low pass filtering means,
      (iv) crystal oscillator means for generating an output signal at a second, higher frequency, and
      (v) means for mixing the outputs of the oscillator means and the modulating means, whereby the output of the mixing means includes a carrier modulated by the amplitude limited, low pass filtered digital data;
(2) means for receiving and demodulating the transmitted data; and
(3) decoder means direct coupled to the output of the demodulating means, for deriving said digital data, including:
   (a) automatic symmetry corrector means for processing the output of said demodulating means to provide a digital waveform constrained to vary about a selected base line,
   (b) means responsive to said digital data pulse waveform for generating a clock pulse, and
   (c) means responsive to said indicator for generating a word synchronization pulse,
whereby said digital data may be transmitted and accurately decoded over a long distance, with relatively low band width and power consumption.

2. A marine seismic exploration system, comprising:
(a) a sonobuoy having at least one hydrophone suspended therefrom,
(b) radio transmission means, including an RF antenna, mounted with said sonobuoy,
(c) signal processing means associated with said sonobuoy and coupled intermediate said at least one hydrophone and said radio transmission means for converting analog signals outputted from said at least one hydrophone to pulse coded digital signals representative of the information content of said analog signals, and
(d) radio receiver means, including RF antenna, for receiving and processing signals transmitted by said radio transmission means,
said radio receiver means including:
a summing amplifier, having as one input thereof, a demodulated digital signal,
means responsive to the output of said summing amplifier for detecting and holding the peak positive value of said output and the peak negative value of said output, and
means for providing the integral of the sum of said peak positive value and said peak negative value,
said integral being applied to another input of said summing amplifier in negative feedback relationship, thereby to reduce the DC level of said output of the summing amplifier in preparation for decoding.

3. A marine seismic exploration system, comprising:
(a) a sonobuoy having at least one hydrophone suspended therefrom,
(b) radio transmission means, including an RF antenna, mounted with said sonobuoy,
(c) signal processing means associated with said sonobuoy and coupled intermediate said at least one hydrophone and said radio transmission means for converting analog signals outputted from said at least one hydrophone to pulse coded digital signals representative of the information content of said analog signals, and
(d) radio receiver means, including RF antenna, for receiving and processing signals transmitted by said radio transmission means,
said radio receiver means including:
a capacitance,
two current paths for charging said capacitance from said signal, one of said current paths permitting a current flow only toward said capacitance and the other of said current paths permitting only current from said capacitance, and
a comparator, having said signal applied to one input thereof, and a current representative of the charge on said capacitance applied to the other input thereof.

4. A marine seismic exploration system, comprising a sonobuoy for receiving seismic information from a plurality of hydrophones;
means for generating digital data representative of said seismic information;
means for radio transmitting said digital data;
means for receiving and demodulating the transmitted data; and
decoder means, direct coupled to the output of the demodulating means, for deriving said digital data,
said decoder means including automatic symmetry corrector means for processing the output of said demodulating means to provide a digital wave-form constrained to vary about a selected base line,
said automatic symmetry corrector means including a negative feedback circuit having input, output, and feedback signals, and wherein the feedback loop includes:
means for detecting and storing a peak positive value of the output signal;
means for detecting and storing a peak negative value of the output signal; and
means for integrating the sum of the positive and negative peak values to derive the feedback signal,
whereby with equal positive and negative peak values, the output signal is constrained to vary about a zero base line.

5. A marine seismic exploration system, comprising:
a sonobuoy for receiving seismic information from a plurality of hydrophones;
means for generating digital data representative of said seismic information;
means for radio transmitting said digital data;
means for receiving and demodulating the transmitted data; and
decoder means, direct coupled to the output of the demodulating means, for deriving said digital data, said decoder means including automatic symmetry corrector means for processing the output of said demodulating means to provide a digital wave-form constrained to vary about a selected base line, said automatic symmetry corrector means including:
a comparator having as one input thereof the output of the demodulating means;
a capacitor connected to the other input of the comparator; and
two diodes connected with opposite polarity between the output of the demodulating means and the capacitor,
whereby digital pulses on said one input having mixed upper peak values and lower peak values charge the capacitor in accordance with a value intermediate between said upper peak value and said lower peak value, and said comparator detects the pulses at said one input as compared to said intermediate value.

* * * * *